Patented Mar. 20, 1934

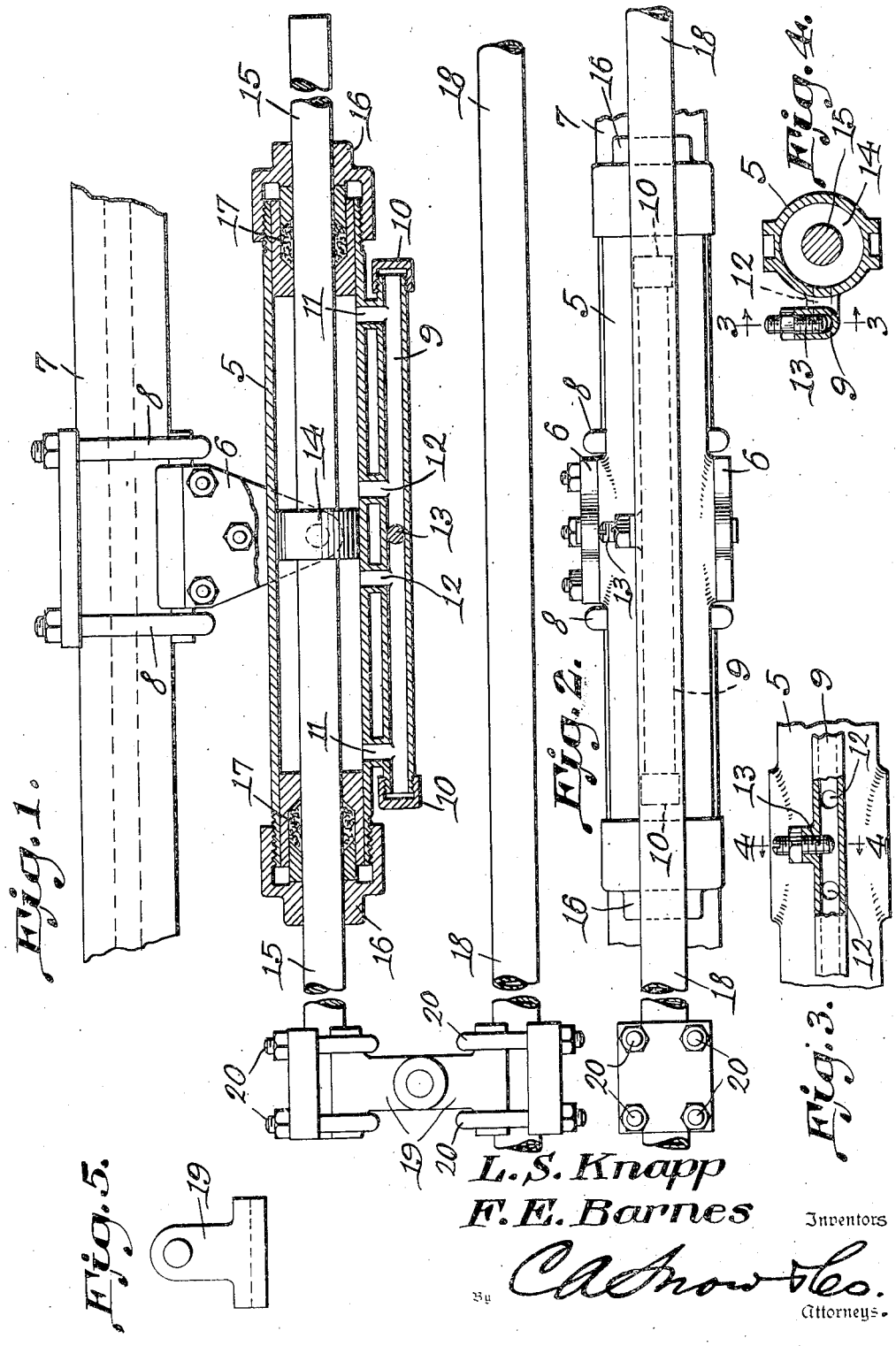

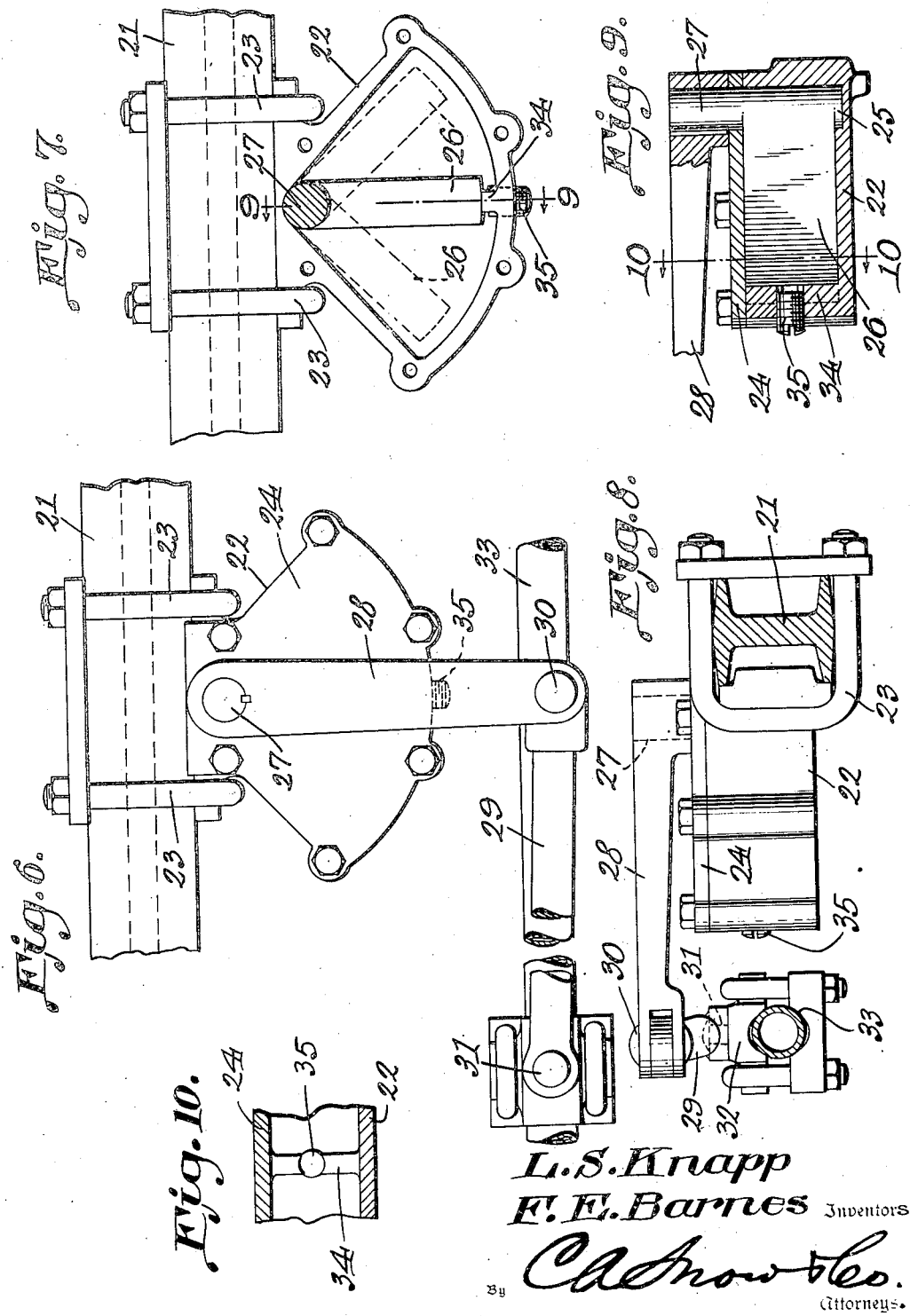

1,951,483

UNITED STATES PATENT OFFICE 1,951,483

SHOCK ELIMINATOR

Laurence S. Knapp and Forrest E. Barnes,
Bozeman, Mont.

Application September 13, 1932, Serial No. 633,012

1 Claim. (Cl. 280—90)

This invention relates to a device designed for use in connection with motor vehicles, the primary object of the invention being to provide means for preventing the communication of road shocks, caused by rough and uneven road surfaces, to the front tires and wheels of an automobile, and thence to the car, eliminating what is commonly known as wheel shimmy.

Another important object of the invention is to provide a device of this character having hydraulic means which may be adjusted, so that the device may be effectively used in connection with heavy or light vehicles, or vehicles wherein the wheel mountings have become exceptionally loose, due to wear.

Another important object of the invention is to provide a device which may be readily and easily mounted, eliminating the necessity of making alterations in the usual vehicle construction to install the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a top plan view of a motor vehicle axle equipped with a device constructed in accordance with the invention, the cylinder being shown in section.

Figure 2 is a rear elevational view of the device.

Figure 3 is a fragmental sectional view taken on line 3—3 of Figure 4.

Figure 4 is a sectional view taken on line 4—4 of Figure 3.

Figure 5 is an elevational view of one of the pivoted sections of the arms employed in connecting the piston rod of the device, to the connecting rod between the wheels of the vehicle.

Figure 6 is a top plan view of a modified form of the invention.

Figure 7 is a top plan view illustrating the fluid housing, with the cover thereof removed.

Figure 8 is a side elevational view of a modified form of the device.

Figure 9 is a sectional view taken on line 9—9 of Figure 7.

Figure 10 is a sectional view taken on line 10—10 of Figure 9.

Referring to the drawings in detail, in the form of the invention as shown by Figure 1, the reference character 5 designates a cylinder which has connection with the bracket 6, that in turn is secured to the front axle 7 of the vehicle, by means of the U-shaped bolts 8, that are shown as embracing the axle at a point substantially intermediate the ends thereof.

The cylinder 5 is provided with a tubular section 9 that is disposed laterally thereof and extended longitudinally of the cylinder 5. The ends of the tubular section are closed by means of the caps 10 so that fluid may be readily supplied or removed from the cylinder.

Disposed near the outer ends of the tubular section 9, are passageways 11, while near the center of the tubular section, are passageways 12, the passageways 11 and 12 establishing communication between the tubular section 9 and cylinder 5, so that fluid in the cylinder 5 may find its way into the tubular section, to accomplish the purpose of the invention.

The reference character 13 designates an adjusting screw that is positioned within a threaded opening formed in the tubular section 9, the adjusting screw extending into the tubular section 9 to restrict the passage of fluid through the tubular section, for purposes to be hereinafter more fully described.

Operating within the cylinder 5 is a piston 14, which is mounted on the rod 15, which rod extends through the caps 16 that close the ends of the cylinder 5, there being provided gaskets 17, for insuring a fluid tight connection between the cylinder and rod 15.

The device operates in conjunction with the tie rod that connects the front wheels of the vehicle, the tie rod being indicated by the reference character 18, and as shown, the rod 15 is connected with the tie rod 18, through the medium of the pivotally connected arms 19, which arms are connected with the rods 15 and 18 respectively, by means of the U-bolts 20.

Thus it will be seen that due to this construction, movement of the tie rod incident to the wheels of the vehicle, passing over an irregular road surface will be checked by the transmission of such movement to the piston 14 and rod 15.

Since the piston acts against the fluid within the cylinder 5, the movement of the rod 18 will be cushioned and restricted to prevent further movement of the wheels.

In the form of the invention as illustrated by sheet two of the drawings, the front axle of a motor vehicle is indicated by the reference character 21, to which the fluid chamber 22 is connected, as by means of the U-bolts 23. This fluid chamber 22 is provided with a removable cover 24, so that access to the interior of the fluid chamber, to vary the quantity of fluid therein, may be had readily.

Mounted within the fluid chamber 22 is a shaft 25 that carries a blade 26, which blade is of a construction to closely fit within the fluid chamber, as clearly shown by Figure 9 of the drawings.

A shaft indicated by the reference character 27 extends upwardly from the blade 26, to which shaft the arm 28 is connected, the arm 28 being in turn pivotally connected with the link 29, at 30. The link 29 connects with the pin 31 that extends vertically from the clamp 32 which is secured to the tie rod 33 that connects the front wheels.

As clearly shown by Figure 7 of the drawings, the blade 26 is of a length to provide a space between the free end of the blade and curved wall of the fluid chamber 22, so that fluid may pass between the blade and fluid chamber when the blade is moved through the fluid chamber, thereby restricting movement of the blade and elements connected therewith.

A rib 34 extends transversely along the inner surface of the chamber 22, and is provided with an opening in which the set screw 35 is mounted, with the result that by adjusting the screw 35, the size of the opening may be adjusted to vary the flow of fluid from one side of the blade to the other.

Since the arm 29 transmits movement of the tie rod 33, to the blade 26, it will be readily seen that the movement of the blade 26 will be restricted, restricting movement of the tie rod and front wheels of the vehicle, caused by the wheels passing over irregular surfaces.

Having thus described the invention, what is claimed is:

The combination with the axle and tie rod connecting the front wheels of a motor vehicle, of a shock eliminator comprising a cylinder containing fluid, means for securing the cylinder to the axle of the vehicle, a by-pass tube forming a part of the cylinder and extended longitudinally of the cylinder, passageways establishing communication between the cylinder and tube, near the ends of the cylinder and tube, a pair of passageways establishing communication between the cylinder and tube, and disposed substantially centrally of the cylinder, a piston rod operating through the cylinder, means for connecting the rod to the tie rod, to move therewith, a piston on the piston rod, said piston acting against the fluid in the cylinder, and an adjustable member extended into the tube between the central passageways, restricting the passage of fluid through the tube, varying the operation of the piston.

LAURENCE S. KNAPP.
FORREST E. BARNES.